United States Patent
Champoux

(10) Patent No.: US 6,614,900 B1
(45) Date of Patent: Sep. 2, 2003

(54) METHOD AND APPARATUS FOR PROCESSING CALL SIGNALING MESSAGES

(75) Inventor: Yanick H. Champoux, Kanata (CA)

(73) Assignee: Alcatel Networks Corporation Societe par Actens de Regime Federal de Respaux Alcatel, Paris (FR)

( * ) Notice: Subject to any disclaimer, the term of this patent is extended or adjusted under 35 U.S.C. 154(b) by 0 days.

(21) Appl. No.: 09/359,363

(22) Filed: Jul. 22, 1999

(51) Int. Cl.[7] ............................................... H04M 7/00
(52) U.S. Cl. .................. 379/229; 379/230; 379/266.01
(58) Field of Search ................................ 379/229, 230, 379/231, 266.01, 266.04

(56) References Cited

U.S. PATENT DOCUMENTS

| | | | | |
|---|---|---|---|---|
| 5,428,781 A | * | 6/1995 | Duault et al. ................ | 395/650 |
| 5,539,816 A | * | 7/1996 | Pinard et al. ............ | 379/207 X |
| 6,085,277 A | * | 7/2000 | Nordstrom et al. ............ | 710/62 |
| 6,118,797 A | * | 9/2000 | O'Shea ........................ | 370/524 |
| 6,212,164 B1 | * | 4/2001 | Murakami et al. .......... | 370/230 |

* cited by examiner

Primary Examiner—Creighton Smith
(74) Attorney, Agent, or Firm—Jon Carl Gealow

(57) ABSTRACT

The invention relates to a method for processing call signalling messages during a communications switch overload condition. The method integral to the invention comprises a dual threshold test, one based on message latency and the other based on queue occupancy. The method begins with the receipt of a plurality of call signalling messages comprising dispensable, indispensable and essential messages. The processing then continues by comparing a new message expected latency with a latency-based threshold. If the new message expected latency compares unfavourably, the queue occupancy is then compared with a queue occupancy based threshold. If this comparison is also unfavourable the call signalling messages are processed based on call type. Using the expected latency as a threshold ensures that no dispensable message has a latency greater than a tunable threshold. Using the queue occupancy as a threshold ensures that when the physical buffer size is exceeded, messages can be intelligently discarded based on message type. Ultimately, use of the dual threshold test results in the throughput of call signalling messages being increased while the latency for all message types is decreased.

31 Claims, 5 Drawing Sheets

METHOD AND APPARATUS FOR PROCESSING CALL SIGNALING MESSAGES

BACKGROUND TO THE INVENTION

1. Field of the Invention

This invention relates generally to the field of data communications and more particularly to a method and apparatus for handling call signalling messages.

2. Description of the Related Prior Art

Communications networks support a multitude of communications between parties. Such communications include voice, data, video, multi-media, e-mail, etc. To initiate a communication, an originating party transmits a communication request, which includes the identity of the originating party, the identity of the destination party or parties, and the type of requested communication, to a local communication processing entity. The local communication processing entity determines, from the request, whether the originating party is authentic, whether it is authorized to access the requested type of communication, and whether the destination party is, or parties are, local to the local communication processing entity.

If the destination party is local, the local communication processing entity provides an incoming communication message to the destination party. The destination party responds to the incoming communication message with a communication connect message that is provided to the local communication processing entity. The local communication processing entity, in response to the communication connect message, establishes a communication path between the originating party and the destination party. In addition, the local communication processing entity supports the communication path until a communication end message is received. At this point, the local communication processing entity tears down the communication path.

If one or more of the destination parties is/are not local to the local communication processing entity, the local communication processing entity provides a connection communication setup message to the communication network. The communication network transports, via an intervening switch or a plurality of intervening switches, the communication setup message to a destination local communication processing entity that is affiliated with a destination party. The destination local communication processing entity provides the setup message to the destination party. In response, the destination party provides a communication connect message to the destination local communication processing entity. The destination local communication processing entity then provides the connect message to the originating local communication processing entity via the communication network. In turn, a communication path is established via the intervening switch or switches of the communication network between the originating and destination local processing entities.

Because the communication network can support a multitude of communications, any switch in the network may become overloaded. Such a switch may be a local communication processing entity and/or an intervening switch within the network. An overload condition may be caused by a burst of overhead data and/or a sustained amount of overhead data messages that exceeds the switch's capacity. As is known, the overhead data messages include call set-up messages, connect messages, call proceeding messages, call release messages, release complete messages, and link layer information.

One technique to reduce the effects of overloading is to queue, in a first-in-first-out (FIFO) manner, incoming overhead data messages. While FIFO queuing works well for most burst conditions, it adds latency when the overload is a sustained overload. The latency can rise above a call set-up time and may even rise above a connect time out. As such, calls and/or set-up messages of calls are dropped.

Another technique for reducing the effects of overloading is to use a last-in-first-out (LIFO) queueing technique as specified in Bell Core TR-PSY-000505 issue 2, section 5.3.8, July 1987. As is known, in a LIFO queueing scheme, the longer an item remains in the queue the less likely it will get processed. But a newly received request (i.e. message), does not wait long unless it gets bumped for a newer message. As such, when the switch is in a sustained overload, some messages are dropped, but they are the oldest ones in the queue. If the dropped message is a call set-up message, the originating party's request is dropped, requiring the originating party to resend the request. If the dropped message is a connect message, the call is dropped before a communication path is established, which wastes the processing efforts of the switch to establish the call up to this point. In addition, the communication path that was at least partially established, is unusable for other communications until a time out expires. Such a time out is typically ten seconds. If the dropped message is a release message, the links i.e. the communication resources, comprising the communication path are wasted i.e. unavailable for reallocation, until a thirty second time out expires. If the thirty second time out is also dropped, the communication resources are permanently hung up.

Another issue with LIFO queueing relates to multi-party calls and the addition of a party to a multi-party call. For such calls, the LIFO dequeuing process may not enqueue the multi-party call set-up messages in the proper order. As such, certain parties may not be added to the multi-party communication. For example, a typical multi-party communication is established by sending a message identifying a request for a multi-party communication and messages to add the parties. If an add party message is received before a multi-party communication message is received, the add party message will be dropped, thereby preventing the identified party from participating in the multi-party communication.

Yet another technique to reduce the effects of overloading is described in a United States application Ser. No. 09/246, 612 filed on Feb. 8, 1999 and owned by Newbridge Networks Corporation, the contents of which are incorporated by reference herein. This application provides a method and apparatus for processing call signalling messages during burst overloading and sustained overloading of a communications switch. Such processing begins by receiving a plurality of call signalling messages, which may be call set-up messages, connect messages, call proceeding messages, call release messages, release complete messages, link layer information and other messages typically generated in the establishment of a call. As defined by the switch programmer, these messages may be designated as either, dispensable messages, indispensable messages or essential messages depending on the criticality of the message in establishing a call. For example, dispensable messages might be designated as those, that if dropped, have minimal impact on the efficiency of the communication switch, whereas essential messages would be categorized as those messages which evoke a time-out process to release whatever communication resources have been allocated to a particular communication set-up request. The processing then continues by comparing a queue occupancy level of a call processing queue with a first queue occupancy threshold. If the queue occupancy level compares unfavourably with the first queue occupancy threshold (e.g., the queue is storing more messages than desired), call signalling messages are enqueued into the call processing queue based on the types of the call signalling messages. For example, dispensable call signalling messages are enqueued in a last-in-first-out (LIFO) manner while indispensable and essential messages are enqueued in a first-in-first-out (FIFO) manner. With such a method and apparatus, burst and/or sustained overload conditions. in a communication switch are handled with reduced latency and without dropping call signalling messages that, when dropped, waste communication resources.

With this technique, when, for example, a Setup (dispensable) message arrives and the queue is in an overloaded state (the buffer size exceeds a fixed threshold) the incoming Setup message takes the position of the first Setup message in the queue, and this Setup message is then "pushed" (i.e. physically moved) to the next Setup message's position. The pushing continues until the Setup with the greatest waiting time is reached. The last message is then dropped from the queue. As can be seen, one of the disadvantages of this technique is that it affects all of the Setup messages in the queue. Additionally, this technique does not guarantee that messages of a different type (dispensable, indispensable, or essential) will be queued and dequeued in the same chronological order. For example, if a Setup message is inserted into the queue before an essential message, it could be dequeued before or after the essential message, depending on the state of the queue. This behaviour is caused by the FIFO/LIFO queueing of dispensable messages. This behaviour could be problematic for some systems where the chronological order of the messages must be preserved. Finally, since the technique relies on thresholds based on queue occupancy levels it cannot address a situation where a given type remains in the queue beyond a desired time.

Therefore a need exists for a method and apparatus that provides higher throughput of call signalling messages during burst and overload conditions, while ensuring that message do not remain in the queue beyond a desired time.

SUMMARY OF THE INVENTION

The present invention seeks to overcome the deficiencies of the prior art by incorporating a latency based queueing algorithm into the proposed method and apparatus. The latency based queueing algorithm uses a threshold based on the-expected latency of the new incoming message to decide the queueing strategy to be adopted.

In accordance with a first embodiment of the present invention, there is defined a method of processing call signalling messages enqueued in a call processing queue, the call signalling messages including one or more dispensable, indispensable and essential messages, the method comprising the steps of: receiving a plurality of call signalling messages; determining the expected latency of the messages in the queue; comparing the expected latency with a predefined latency based threshold; when the expected latency compares favourably with the latency based threshold, enqueuing the plurality of call signalling messages in the queue; when the expected latency compares unfavourably with the latency based threshold, determining the queue occupancy level of the queue; comparing the queue occupancy level with a predefined queue occupancy threshold; and when the queue occupancy level compares unfavourably with the queue occupancy threshold, enqueuing the plurality of call signalling messages into the call processing queue based on the type of call signalling message.

In accordance with a second embodiment of the present invention, there is defined a call signal processing module comprising: a call processing queue; processing means; memory operably connected to the processing means, wherein the memory stores operational instructions that cause the processing means to: (i) receive a plurality of call signalling messages; (ii) determine the expected latency of messages in the queue; (iii) compare the expected latency with a predefined latency based threshold; (iv) when the expected latency compares favourably with the latency based threshold, enqueue the plurality of call signalling messages in the queue; (v) when the expected latency compares unfavourably with the latency based threshold, determine the queue occupancy level of the queue; (vi) compare the queue occupancy level with a predefined queue occupancy threshold; and (vii) when the queue occupancy level compares unfavourably with the queue occupancy threshold, enqueue the plurality of call signalling messages into the call processing queue based on the type of call signalling message.

In accordance with a third embodiment of the present invention, there is defined a computer-readable medium having stored thereon computer-executable instructions for performing the steps of: receiving a plurality of call signalling messages into a queue; determining the expected latency of messages in the queue; comparing the expected latency with a predefined latency based threshold; when the expected latency compares favourably with the latency based threshold, enqueuing the plurality of call signalling messages in the queue; when the expected latency compares unfavourably with the latency based threshold, determining the queue occupancy level of the queue; comparing the queue occupancy level with a predefined queue occupancy threshold; and when the queue occupancy level compares unfavourably with the queue occupancy threshold, enqueuing the plurality of call signalling messages into the call processing queue based on the type of call signalling message.

In accordance with a fourth embodiment of the present invention, there is defined a computer system for increasing the throughput of call signalling messages comprising: means for receiving a plurality of call signalling messages; means for storing said plurality of call signalling messages; means for processing the plurality of call signalling messages; and means for transmitting the plurality of call signalling messages, wherein the processing means operating on computer-executable instructions stored in the storage means determines the manner in which the call signalling messages will be processed utilizing two threshold tests performed sequentially, wherein the first test compares a new message expected latency to a latency based threshold and wherein the second test compares a queue occupancy level to a queue occupancy threshold.

BRIEF DESCRIPTION OF THE DRAWINGS

A better understanding of the invention will be obtained by reading the description of the invention below, with reference to the following drawings, in which.

DETAILED DESCRIPTION OF THE PREFERRED EMBODIMENT

Figure 1:
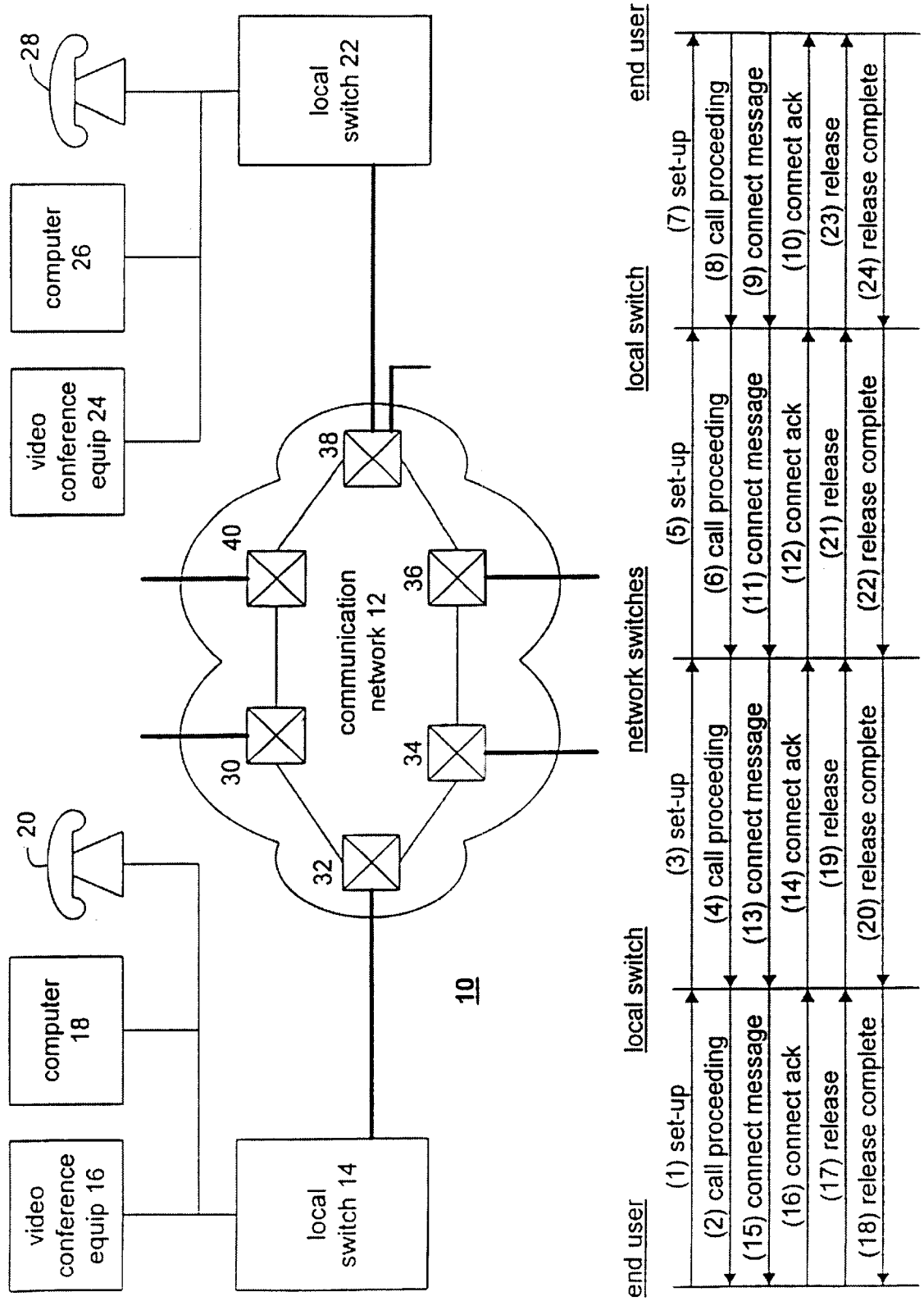
FIG. 1 illustrates a schematic block diagram of a communication network in accordance with the present invention.

In general, the present invention provides a method and apparatus for processing call signalling messages during burst overloading and sustained overloading conditions. The present invention can be more fully described with reference to FIGS. 1 through 6. FIG. 1 illustrates a schematic block diagram of a communication system 10 and associated call signalling messages. The communication system 10 includes a communication network 12 operably coupled to local switches 14 and 22. The local switches 14 and 22 are operably coupled to end user devices such as telephones 20, 28, computers 18, 26 and/or video conferencing equipment 16, 24. The local switches may also be coupled to switching type equipment such as a private branch exchange (PBX), local server, router, etc. The communication network 12 includes a plurality of switches 30–40 that are each coupled to one or more local switches (only local switches 14 and 22 are shown). The switches 30–40 are intervening switches between local switch 14 and local switch 22. In practice, the switches 30–40 and the local switches 14 and 22 may be of the same type such as frame relay switches, asynchronous transfer mode switches, private branch exchanges, central office exchanges, packet switches or the like.

To establish a communication between end-users, for example between an end user associated with local switch 14 and an end user associated with local switch 22, an originating end user transmits a set up message to the local switch. This is illustrated in the switch relay diagram portion of FIG. 1. Note that the numbers in parentheses indicate the ordering of call signalling messages. As such, a communication begins when the originating party, or end-user 16–20 or 24–28, sends a call set-up message to its local switch 14 or 22. The local switch 14 or 22 provides a call proceeding message to the end user and also relays the set-up message to the network switches. The network switches provide a call proceeding message to the originating local switch and also provides the call set-up message to the destination local switch. As one of average skill in the art will appreciate, the network switches may be a single switch within the network or a plurality of switches, depending on communication path routing conventions within the network. As one of average skill in the art will also appreciate, each switch in the network may provide a call proceeding message to a previous switch and relay the call set-up message to a subsequent switch.

Upon receiving the set-up message, the destination local switch provides a call proceeding message to the network switches and provides the call set-up message to the destination end user. In response, the destination end-user provides a connect message to the destination local switch which provides the connect message to the network switches and a connect acknowledge message to the destination end user. The network switches provide the connect message to the originating local switch and the connect acknowledge message to the destination local switch.

The originating local switch then provides the connect message to the originating end-user, which, in turn, provides the connect acknowledge message to the originating local switch. At this point, a communication path is established between the end-users and remains intact until one of the parties initiate a release message.

In this illustration, the originating end-user initiates the release message, which it provides to the originating local switch. The originating local switch relays the release message to the network switches and provides a release complete message to the originating end user. The network switches relay the release message to the destination local switch and provide a release complete message to the originating local switch. The destination local switch relays the release message to the destination end-user and provides a release complete message to the network switches. Upon receiving the release message, the destination end user provides a release complete message to the destination local switch. At this point, the communication path between the originating end-user and destination end-user is completely torn down. As any one skilled in the art will be aware, the above description is just one example of a call set up and tear down process.

Figure 2:
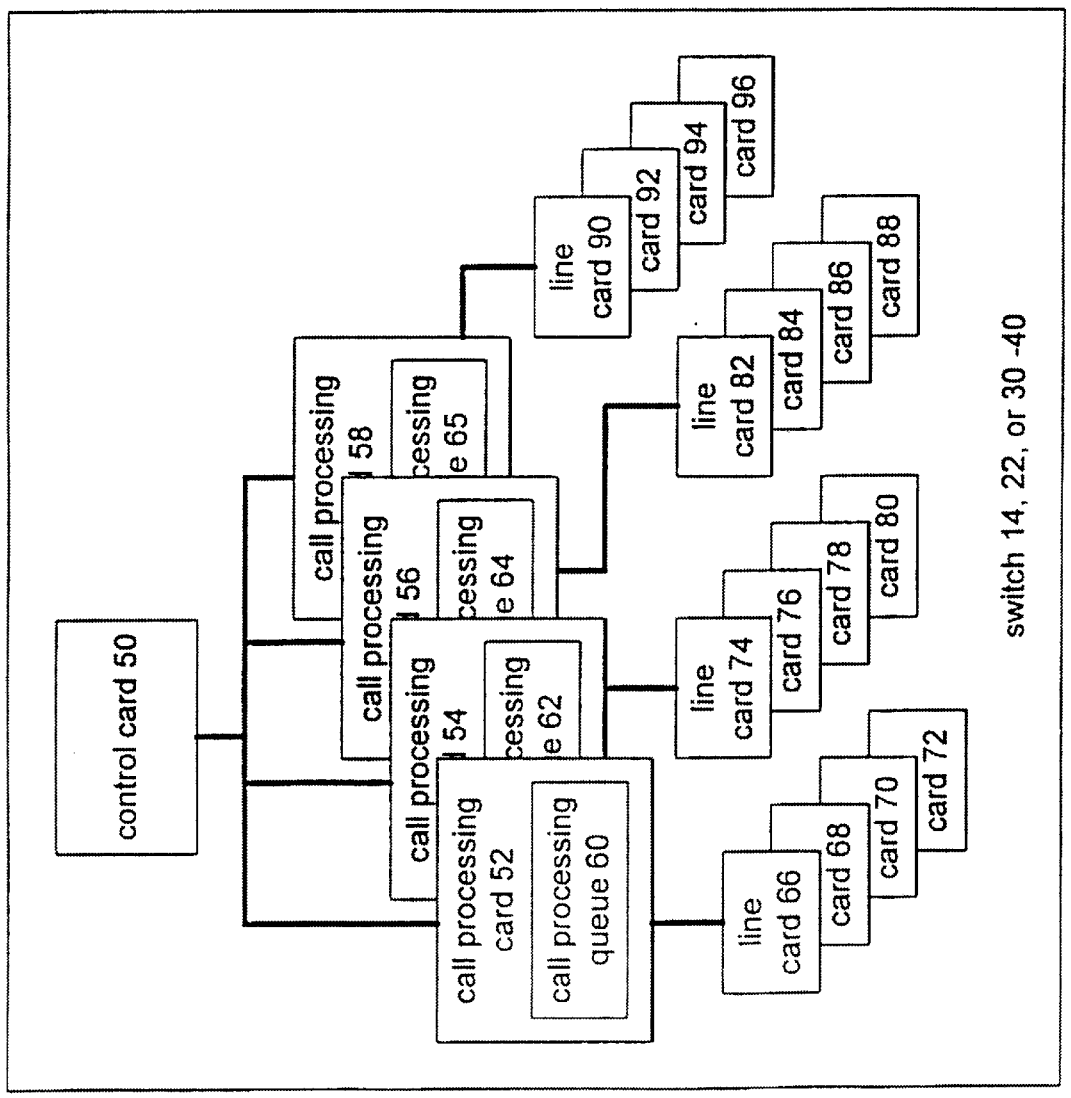
FIG. 2 illustrates a schematic block diagram of a switch in accordance with the present invention.

FIG. 2 illustrates a schematic block diagram of an intervening switch 30–40 and/or local switch 14, 22. The switch includes a control card 50, a plurality of call processing cards 52–58 and a plurality of line cards 66–96. As shown, each of the call processing cards 52–58 includes a call processing queue 60–65 and further includes a call signal processing module 100 (see FIG. 3) or the equivalent functionality thereof. Each of the call processing cards 52–58 is associated with a plurality of line cards 66–72, 74–80, 82–88, and 90–96. As is known in the art, each line card supports a standardized communication interface, a portion thereof, or multiple interfaces. Such interfaces include T1 links, E1 links, OC3 links, T3 links, E3 links, STM I links, OC 12 links, etc. The call processing queue 60, 62, 64, 65 of the call processing card 52, 54, 56 and 58 enqueues the call signalling messages of each associated line card. As such, the call processing queue 60, 62, 64, 65 may include a single queue that is used for each of the line cards or a separate queue, one for each line card. As one of average skill in the art will appreciate, the illustrated switch architecture is one of many possible architectures. For example, the control functionality and the call processing functionality may be implemented on a single card that supports all of the line cards, or may be implemented on several cards, each supporting a group of line cards. In addition, the switch may be implemented with a single call processing queue.

In operation, a call processing card determines whether call signalling messages for a particular line card are in an overload condition. This is accomplished by reference to defined thresholds which will be described with reference to FIG. 5. The call processing cards each include a plurality of dequeuing lists to track the call signalling messages and their particular type or status. These dequeuing lists will be described in greater detail with reference to FIG. 4. The functionality of the call processing card with respect to processing overload conditions will be discussed in greater detail with reference to FIGS. 4 and 5.

Figure 3:
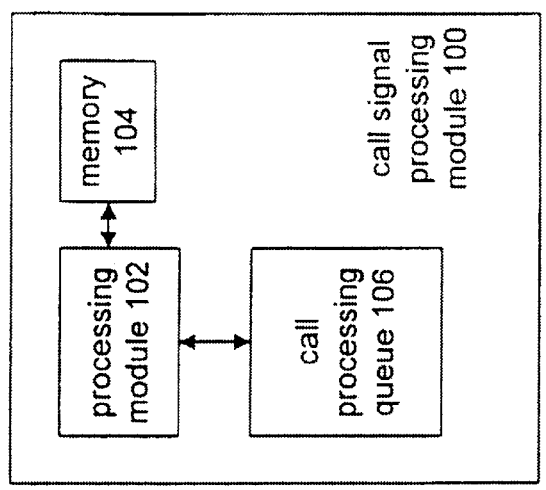
FIG. 3 illustrates a schematic block diagram of a call signal processing module in accordance with the present invention.

FIG. 3 illustrates a schematic block diagram of a call signal processing module 100 that includes a processing module 102, memory 104, and a call processing queue 106. The processing module 102 may be a single processing entity or a plurality processing entities. Such a processing entity may be a microprocessor, micro controller, digital signal processor, central processing unit, microcomputer, state machine, logic circuitry and/or any device that manipulates digital information based on operational instructions. The memory 104 may be a single memory device or a plurality of memory devices. The memory device may be a random access memory, read-only memory, floppy disk memory, system disk memory, hard drive memory, external magnetic tape memory, CD ROM, and/or any device that stores digital information that is retrievable. Note that when the processing module implements one or more of its functions utilizing a state machine and/or logic circuitry, the memory containing the corresponding instructions is embedded within the circuitry comprising the state machine and/or logic circuitry. The operational instructions stored in memory 104 and executed by processing module 102 will be discussed in greater detail with reference to FIG. 5.

Figure 4:
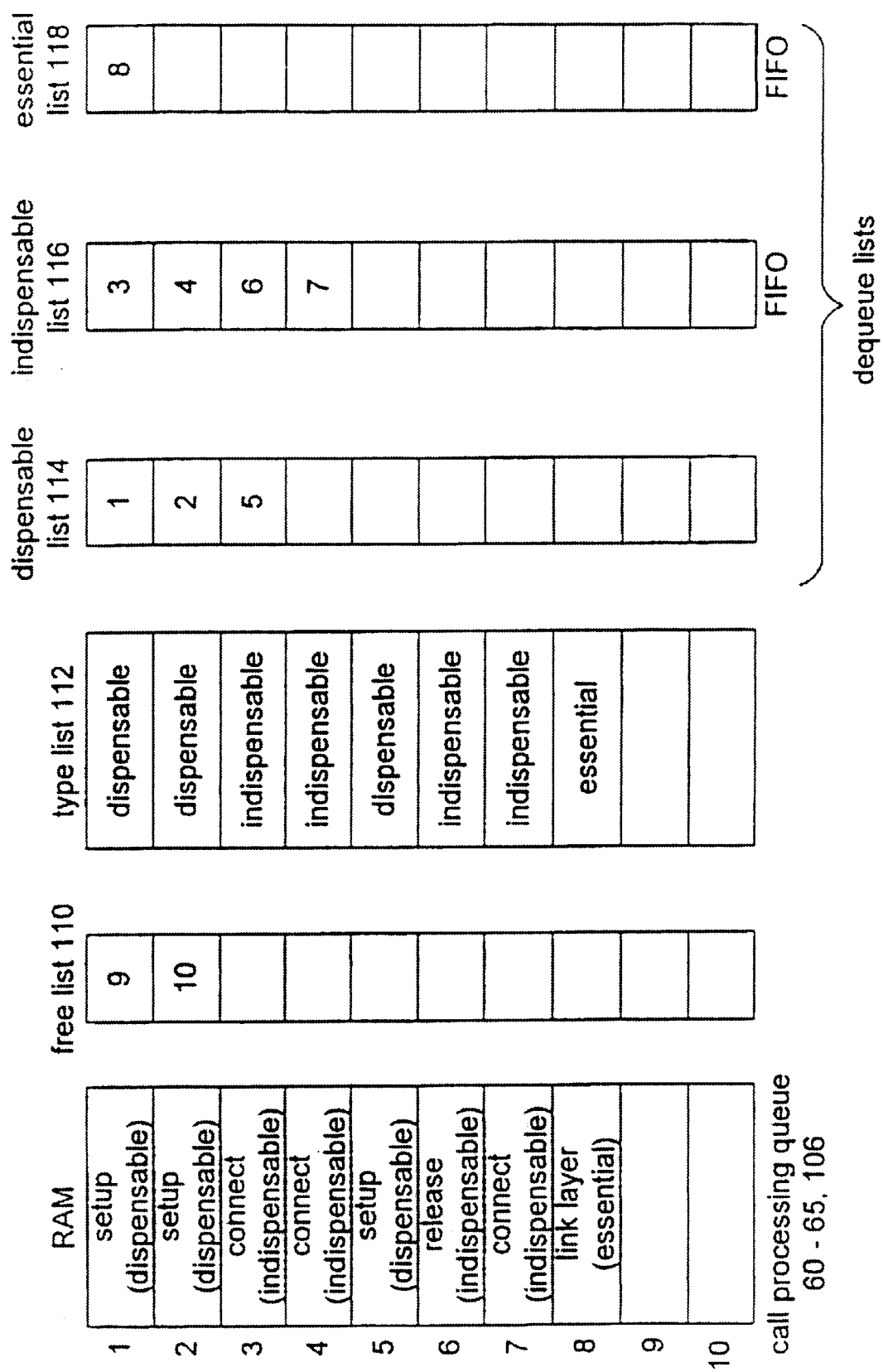
FIG. 4 illustrates a graphical representation of call signal processing queues in accordance with the present invention.

FIG. 4 illustrates a graphical representation of the call processing queue 60–65 and 106 and a plurality of dequeuing lists. The dequeuing lists include a free list 110, a type list 112, a dispensable list 114, an indispensable list 116, and an essential list 118. In this illustration, the call processing queue 60–65 and 106 includes 10 locations. Of the 10 locations, the first eight include a call signalling message, while locations 9 and 10 are empty. The free list 110 includes the address of each if the entries within the call processing queue that are free (9 and 10, in this example). As such, as a call signalling message is removed from the call processing queue, the corresponding address is added to the free list 110. Conversely, when an entry is added into the call processing queue, the free list is addressed to identify a free location within the call processing queue and when data is entered therein, the corresponding address is removed from the free list.

The type list 112 identifies the particular types of call signalling messages that have been received and in what order. Such call signalling message types include dispensable, indispensable and essential messages, depending on the criticality of the message in establishing a call. Dispensable messages might be designated as those, that if dropped, have minimal impact on the efficiency of the communication switch, whereas essential messages would be categorized as those messages which evoke a time-out process to release whatever communication resources have been allocated to a particular communication set-up request. For example, call setup messages may be dispensable, link layer information may be essential, and other call signalling messages may be indispensable. As one of average skill in the art would appreciate, the assignment of the types of the call signalling messages as being dispensable, indispensable and essential may vary depending on the desired operation of the system. As one of average skill in the art will appreciate, the indispensable list 116 and the essential list 118 can be combined into a single list. With respect to the preferred embodiment of the present invention the following chart describes the message types associated with a particular message category:

| Message Category | Message Type |
| --- | --- |
| Essential | Connection Indication |
|  | Disconnect Indication |
| Indispensable | Call Proceeding |
|  | Connect |
|  | Release |

-continued

| Message Category | Message Type |
| --- | --- |
| Dispensable | Setup |
|  | Add Party |

To dequeue the call signalling messages from the call processing queue, the dequeuing lists are utilized. The dequeuing process begins by determining the first entry in the type list 112. As shown, this entry is a dispensable call signalling message. As such, the dispensable list 114 is accessed. The manner in which the dispensable message is dequeued is dependent on whether or not there is a dispensable message in the queue and whether or not thresholds T1 (the latency-based first threshold) and T2 (the queue occupancy second threshold) are breached. The dispensable list 114 will operate in a first-in-first-out (FIFO) manner providing T1 is not breached. When T1 is breached, the dispensable message is assessed against T2. If T2 is breached, the dispensable list is accessed and the message processed in accordance with a first scheme (to be described with reference to FIG. 5). If T2 is not breached, the message is processed in accordance with a second scheme (to be described with reference to FIG. 5).

The dual threshold test that is employed in the method of the present invention addresses two separate problems:

(a) the first threshold is a latency based threshold which limits the time that a dispensable message will spend in the queue. Past a certain waiting time, a dispensable message becomes useless. As a result, an intelligent early discard can save processing time and buffer space; and (b) the second threshold is an occupancy based threshold which is invoked when the queue is near, if not at, its maximal capacity. As the queue is heavily loaded, it is certain that some messages will have to be discarded. The second threshold serves to discard intelligently the least critical message.

It is important to note that one threshold can be used independently of the other to accomplish their individual task. However, for optimal efficiency a two threshold method is desirable.

Figure 5:
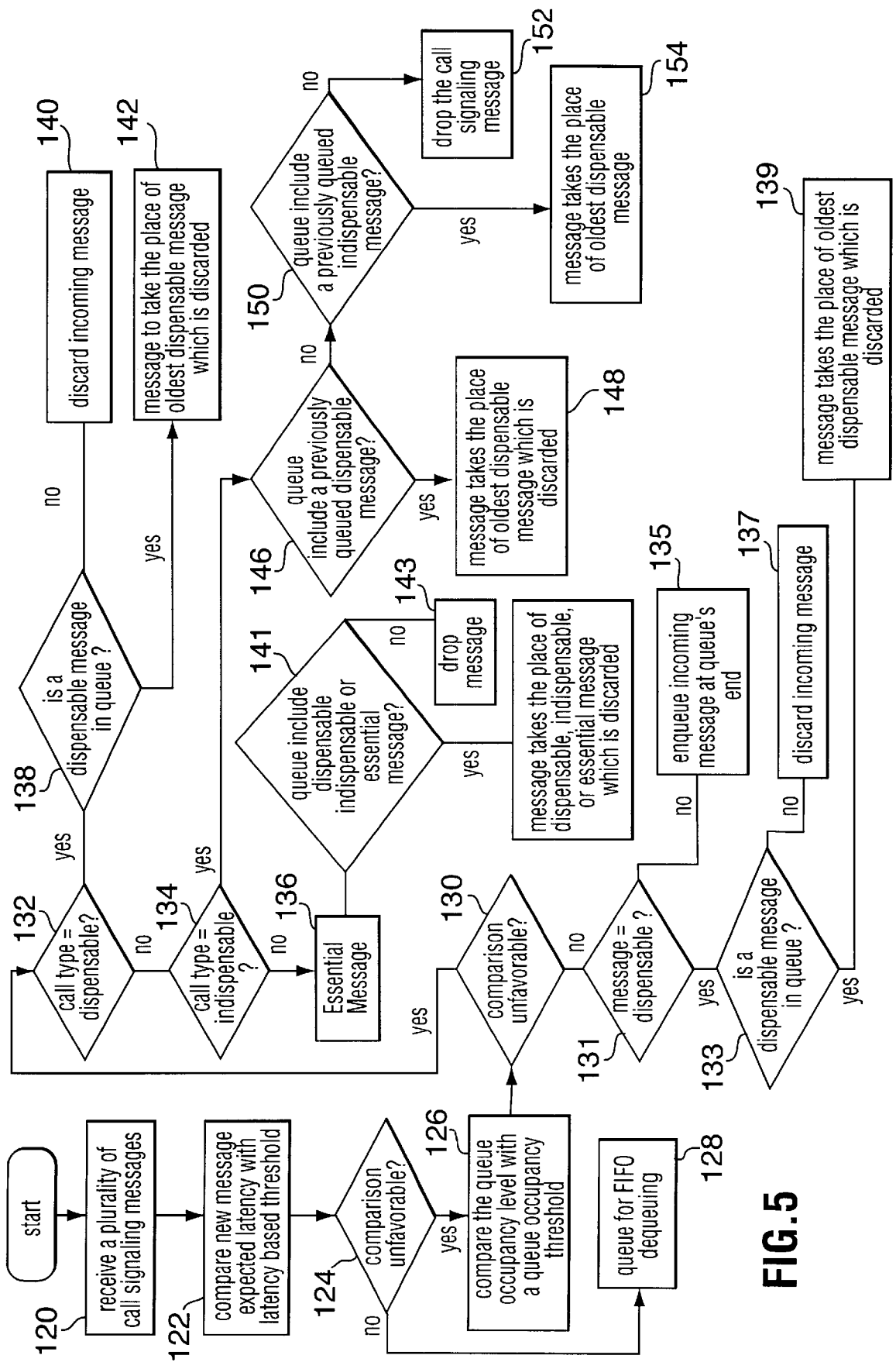
FIG. 5 illustrates a logic diagram of a method for processing call signalling messages in accordance with the present invention.

FIG. 5 illustrates a logic diagram of a method for processing call signalling messages. The processing begins at step 120 where a plurality of call signalling messages are received. These messages may either, dispensable messages, indispensable messages or essential messages. The process then proceeds to step 122 where a new message expected latency is compared with a latency based first threshold. The first threshold ensures that, with the arrival of a new message, the combined latency of all messages in the queue does not exceed a defined threshold. The new message expected latency is defined as:

Assume that the system uses n (where n is an integer) types of messages

Define Message_Type_I with I equal to 1 to n as the identifier for those n different types of messages.

To each message type is assigned a counter that holds the current number of messages of this type actually present in the queue. This counter is denoted Number_of [Message_Type_I] for each I=1 . . . n To each message type is assigned a weight, where the weight is equal to the processing time. Note that in the preferred embodiment the weights are static. However, the weights could be dynamic, based on the state of the system. This alternate functionality is meant to be included within the scope of the invention.

Let First_Threshold_Value be equal to the maximum acceptable latency for a dispensable message, typically in the range of 1/10 of a second New_message_expected_latency=Weight [Message_Type_1]×Number_of

[Message_Type_1]+Weight [Message_Type _2]× Number_of

[Message_Type_2]+. . . Weight [Message_Type_n]× Number_of

[Message_Type_n]

The following table provides an indication of the typical processing times associated with some of the call signalling messages which may be resident in the call processing queue:

| MESSAGE TYPE | PROCESSING TIME (Seconds) |
| --- | --- |
| SETUP | 0.011769 |
| CALL PROCEEDING | 0.006000 |
| CONNECT | 0.041649 |
| CONNECT ACK | 0.000263 |
| RELEASE | 0.002038 |
| RELEASE COMPLETED | 0.002185 |

The process then proceeds to step 124 where a determination is made as to whether the comparison at step 122 was unfavourable (i.e. New_message_expected_latency >First_Threshold_Value). If the comparison was not unfavourable, the process proceeds to step 128. At step 128, the call processing queue is enqueued such that the call signalling messages may be dequeued in a FIFO manner. It will be understood by those skilled in the art that the terms "compare" and "determine" as described involve a direct mathematical comparison as follows:

IF (Present_Value>Threshold) THEN
  Threshold Crossed
ELSE
  Threshold Not Crossed
END In terms of FIG. 5, the event "comparison unfavourable" can be mapped to "threshold crossed".

If the comparison at step 124 was unfavourable, the process proceeds to step 126. At step 126, a second threshold, the queue occupancy level, is compared with a queue occupancy second threshold. The queue occupancy level is defined as:

Let Second_Threshold_Value be the maximum number of messages the queue is capable of storing Let Number_of_Messages_In_The_Queue be the number of messages actually present in the queue.

where the total number of messages the queue is capable of storing is equal to the buffer size in the processing unit.

The process then proceeds to step 130 where a determination is made as to whether the comparison at step 130 was unfavourable (i.e. Number_of_Messages_In_The_ Queue>Second_Threshold_Value). If the comparison at step 130 was favourable, the process proceeds to step 131. At step 131, there is a determination as to whether the message is a dispensable message. It will be understood by those skilled in the art that the word "determination" means the mapping of the message type to the message category (essential, indispensable or dispensable). If the currently received message is a not a dispensable message, than the incoming message is enqueued at the queue's end. If the message is a dispensable than a determination is made as to whether or not there is a dispensable message presently in the queue. If there is not such a message in the queue, then the new message (which is a dispensable message) will be discarded. If there is such a message in the queue, than the new (dispensable) message will take the place of the oldest dispensable message which will be discarded.

If the comparison at step 130 was unfavourable, the process proceeds to step 132. At step 132 a determination is made as to whether the call signalling message type is dispensable. If the call signalling message type is dispensable, the process proceeds to step 138 where a determination is made as to whether or not there is a dispensable message in the queue. If there is, than the process proceeds to step 140 and the dispensable message takes the place of the oldest dispensable message which is discarded. If there is not, than the process proceed to step 142 and the new message is discarded.

If the newly received call signalling message is not dispensable, than the process proceeds to step 134 where a determination is made as to whether the call signalling message type is indispensable. If the call signalling message is an indispensable message, the process proceeds to step 146. At step 146, a determination is made as to whether the call processing queue currently includes a queued dispensable message. If so, the process proceeds to step 148 where the call signalling message takes the place of the oldest previously queued dispensable message which is discarded.

If, however, the queue does not include a currently enqueued dispensable message, the process proceeds to step 150. At step 150, a determination is made as to whether the queue includes a previously queued indispensable message. If not, the process proceeds to step 152 where the newly received indispensable call signalling message is dropped. If, however, the queue includes a previously queued indispensable message, the process proceeds to step 154 where the newly received message takes the place of the oldest dispensable message which is discarded.

If the newly received call signalling message is not indispensable, than the process proceeds to step 136 where, by default, it is processed as an essential message. At step 141, a determination is made as to whether the call processing queue currently includes a queued dispensable, indispensable or essential message. If it does not than the process proceeds to step 143 where the newly received message is dropped. If there is such a message in the queue than the newly received essential message takes the place of the oldest dispensable, indispensable or essential message in that order i.e. a dispensable message will be deleted before a dispensable message or essential message and a dispensable message will be deleted before an essential message.

Figure 6:
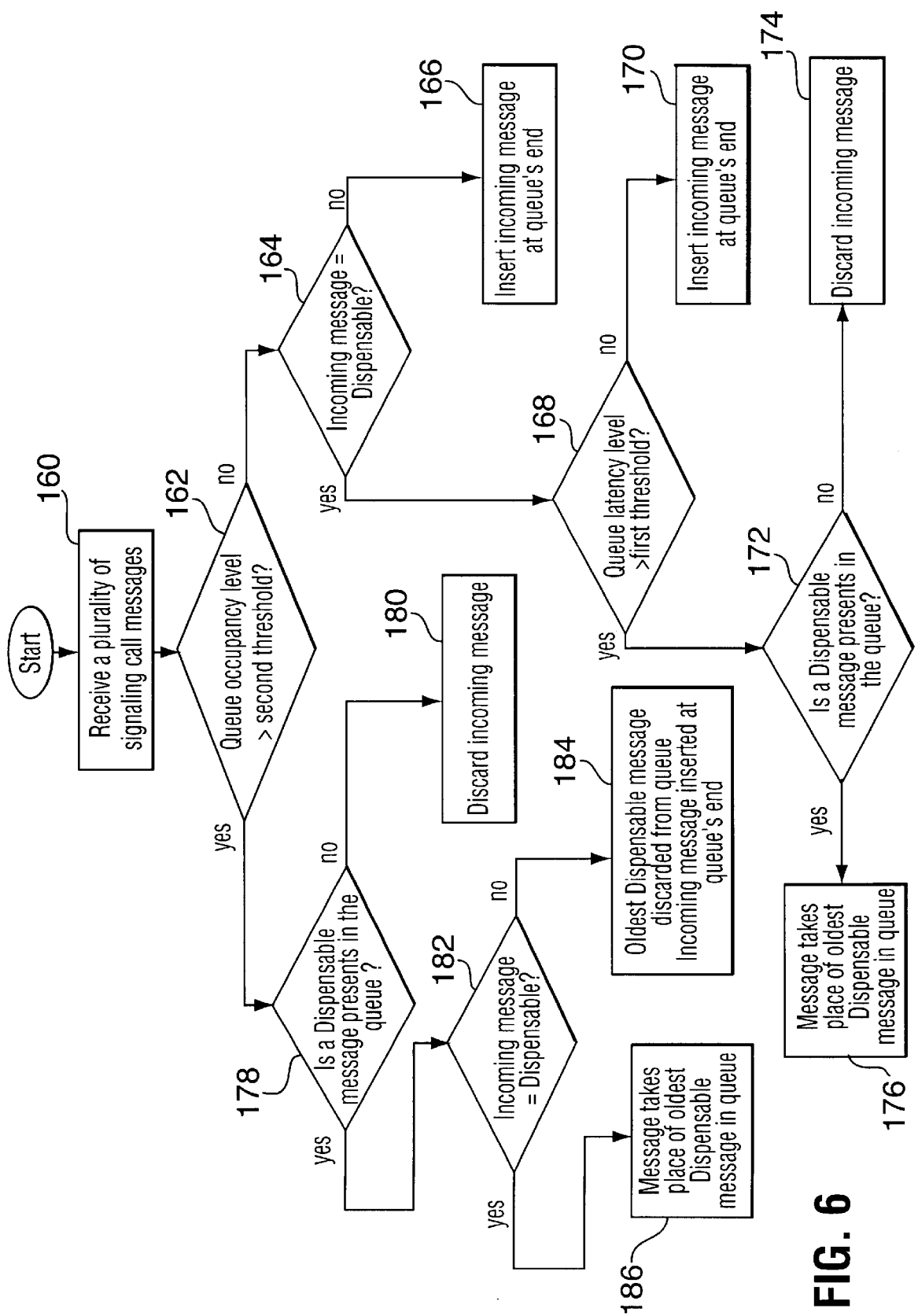
FIG. 6 illustrates an alternate embodiment of the present invention as shown in FIG. 5.

FIG. 6 offers an alternate embodiment of the present invention. The processing begins at step 160 where a plurality of call signalling messages are received. At step 162 a second threshold, the queue occupancy level, is compared with a queue occupancy second threshold. If the comparison is favourable, then the process proceeds to step 164 where there is a determination made as to whether or not the message is dispensable. If it is not then the process proceeds to step 166 where the incoming message is inserted at the queue's end. If the message is dispensable, then the process proceeds to step 168 where the queue latency level is compared with a first threshold. If the comparison is favourable, then the incoming message (a dispensable message) is inserted at the queue's end, as described in step 170. If the comparison is favourable, than there is a determination made at step 172 as to whether or not there is a dispensable message in the queue. If there is not such a message, then the new message is discarded as shown in step 174. If there is such a message than the process proceeds to step 176 and the new message takes the place of the oldest dispensable message in the queue which is discarded.

If, at step 162, the comparison is unfavourable, than there is a determination made as to whether or not there is a dispensable message in the queue at step 178. If there is not, then at step 180 the new message is discarded. If there is, than at step 182 there is a determination s to whether or not the new message is dispensable. If it is, than the new message takes the place of the oldest dispensable message in the queue which is discarded, as described at step 186. If it is not, than the process proceeds to step 184 and the oldest dispensable message is discarded from the queue.

The advantages of the present invention over the prior art are now apparent. With the methodology integral to the prior art, when a dispensable message arrived in the queue which was in an overloaded state (i.e. the buffer size exceeded a fixed threshold) the incoming dispensable message took the place of the first dispensable message in the queue, with the first dispensable message being "pushed" to the next dispensable message's position. The "pushing" would continue until the dispensable message with the greatest waiting time was reached. This last message would then be dropped from the queue. With the latency-base methodology integral to the method of the present invention, no "pushing" takes place. Instead the dispensable message with the greatest waiting time is replaced directly by the new message. As a result, none of the messages already in the queue are affected. Further, using the expected latency of the incoming message as a threshold provides significantly more control over the queue's latency performance by ensuring that no message of a given type has a latency greater than a tunable fixed bound. The end result is that the queue's behaviour is improved. The queue's throughput increases slightly while the latency for all message types decreases. Additionally, use of the methodology integral to the present invention simplifies the queueing process without affecting the quality of service.

A person skilled in the art may now conceive of alternative structures and embodiments or variations of the above. All of those which fall within the scope of the claims appended hereto are considered to be part of the present invention.

The embodiments of the invention in which an exclusive property or privilege is claimed are defined as follows:

1. A method of processing signalling messages including one or more types of signalling messages, the method comprising the steps of:
   (a) determining expected latency of a signalling message to be enqueued in a queue;
   (b) comparing said expected latency with a predefined latency based threshold;
   (c) when the expected latency compares favourably with the latency based threshold, enqueuing the signalling message in said queue; and
   (d) when the expected latency compares unfavourably with the latency based threshold, enqueuing the signalling message into the queue based on the type of signalling message.

2. The method of claim 1, wherein step (d) further comprises the steps of:
   (i) when the expected latency compares unfavourably with the latency based threshold, determining the queue occupancy level of said queue;
   (ii) comparing said queue occupancy level with a predefined queue occupancy threshold; and
   (iii) when the queue occupancy level compares unfavourably with the queue occupancy threshold, enqueuing the signalling message into the queue based on the type of signalling message.

3. The method of claim 2 in which the types of signalling messages include dispensable messages, indispensable messages and essential messages.

4. The method of claim 3 further comprising the step of determining if the type is dispensable, indispensable or essential when the queue occupancy level compares unfavourably with the queue occupancy threshold.

5. The method of claim 4 further including
   (a) when the signalling message is a dispensable message, determining if there is a dispensable message in the queue;
   (b) when there is a dispensable message in the queue, inserting the message in place of the oldest dispensable message and discarding the oldest dispensable message; and
   (c) when there is not a dispensable message in the queue, discarding the signalling message.

6. The method of claim 5 further comprising the steps of:
   (a) when the signalling message is an indispensable message, determining if the queue includes a previously queued dispensable message;
   (b) when the queue does include a previously queued dispensable message, deleting the oldest previously queued dispensable message from the queue and enqueuing the indispensable signal message;
   (c) when the queue does not include a previously queued dispensable message, determining if the queue includes a previously queued indispensable message;
   (d) when the queue includes a previously queued indispensable message, deleting the oldest previously queued indispensable message from the queue and enqueuing the indispensable signal message; and
   (e) when the queue does not include a previously queued indispensable message, dropping the indispensable signalling message.

7. The method of claim 6 further comprising the steps of:
   (a) when the signalling message is an essential message, determining if there is a dispensable, indispensable or essential message in the queue;
   (b) when the queue does not include a previously queued dispensable, indispensable or essential message, dropping the essential signalling message; and
   (c) when the queue includes a previously queued dispensable, indispensable or essential message, deleting in ascending order either the oldest previously queued dispensable message, the oldest previously queued indispensable message or the oldest previously queued essential message from the queue, and enqueuing the essential signal message.

8. The method of claim 7 further including:
   (a) when the queue occupancy level compares favourably with the queue occupancy threshold, determining if the signalling message is a dispensable message;
   (b) when the signalling message is not a dispensable message enqueuing the signalling message at the queue's end;
   (c) when signalling message is a dispensable message, determining if there is a dispensable message in the queue;

(d) when a dispensable message is in the queue, inserting the signalling message in place of the oldest dispensable message and discarding the oldest dispensable message; and (e) when a dispensable message is not in the queue, discarding the signalling message.

9. The method of claim 8 further including queueing the signalling message for first-in-first-out dequeuing when the expected latency compares favourably with the latency based threshold.

10. The method of claim 9 further comprising maintaining a plurality of dequeuing lists, wherein the plurality of dequeuing lists track available locations in the queue, an ordered list of types of signalling messages, an ordered list of dispensable messages, an ordered list of indispensable messages, and an ordered list of essential messages.

11. The method of claim 10 further comprising updating the plurality of dequeuing lists when enqueuing changes occur, wherein the enqueuing changes occur when the expected latency compares unfavourably with the latency based threshold or when the queue occupancy level compares unfavourably with the queue occupancy threshold.

12. A signal processing module comprising:
  (a) a queue;
  (b) processing means;
  (c) memory operably connected to the processing means, wherein the memory stores operational instructions that cause the processing means to:
    (i) receive a signalling message;
    (ii) determine expected latency of the signalling message to be enqueued in the queue;
    (iii) compare said expected latency with a predefined latency based threshold;
    (iv) when the expected latency compares favourably with the latency based threshold, enqueue the signalling message in said queue; and
    (v) when the expected latency compares unfavourably with the latency based threshold, enqueuing the signalling message into the queue based on the type of signalling message.

13. The processing module of claim 12 in which the types of signalling messages include dispensable messages, indispensable messages and essential messages.

14. The processing module of claim 13 wherein the memory further comprises operational instructions to determine if the type is dispensable, indispensable or essential when the queue occupancy level compares unfavourably with the queue occupancy threshold.

15. The processing module of claim 14 wherein the memory further comprises operational instructions to:
  (a) when the signalling message is a dispensable message, determining if there is a dispensable message in the queue;
  (b) when there is a dispensable message in the queue, inserting the message in place of the oldest dispensable message and discarding the oldest dispensable message; and
  (c) when there is not a dispensable message in the queue, discarding the signalling message.

16. The processing module of claim 15 wherein the memory further comprises operational instructions to:
  (a) when the signalling message is an indispensable message, determine if the queue includes a previously queued dispensable message;
  (b) when the queue does include a previously queued dispensable message, delete the oldest previously queued dispensable message from the queue and enqueue the indispensable signal message;
  (c) when the queue does not include a previously queued dispensable message, determine if the queue includes a previously queued indispensable message;
  (d) when the queue includes a previously queued indispensable message, delete the oldest previously queued indispensable message from the queue and enqueue the indispensable signal message; and
  (e) when the queue does not include a previously queued indispensable message, drop the indispensable signalling message.

17. The processing module of claim 16 wherein the memory further comprises operational instructions to:
  (a) when the signalling message is an essential message, determining if there is a dispensable, indispensable or essential message in the queue;
  (b) when the queue does not include a previously queued dispensable, indispensable or essential message, dropping the essential signalling message; and
  (c) when the queue includes a previously queued dispensable, indispensable or essential message, deleting in ascending order either the oldest previously queued dispensable message, the oldest previously queued indispensable message or the oldest previously queued essential message from the queue, and enqueuing the essential signal message.

18. The processing module of claim 17 wherein the memory further comprises operational instructions to:
  (a) when the queue occupancy level compares favourably with the queue occupancy threshold, determining if the signalling message is a dispensable message;
  (b) when the signalling message is not a dispensable message enqueuing the signalling message at the queue's end;
  (c) when signalling message is a dispensable message, determining if there is a dispensable message in the queue;
  (d) when a dispensable message is in the queue, inserting the signalling message in place of the oldest dispensable message and discarding the oldest dispensable message; and
  (e) when a dispensable message is not in the queue, discarding the signalling message.

19. The processing module of claim 18 wherein the memory further comprises operational instructions to queue the signalling message for first-in-first-out dequeuing when the expected latency compares favourably with the latency based threshold.

20. The processing module of claim 19 wherein the memory further comprises operational instructions to maintain a plurality of dequeuing lists, wherein the plurality of dequeuing lists track available locations in the queue, an ordered list of types of signalling messages, an ordered list of dispensable messages, an ordered list of indispensable messages, and an ordered list of essential messages.

21. The processing module of claim 20 further comprises updating the plurality of dequeuing lists when enqueuing changes occur, wherein the enqueuing changes occur when the expected latency compares unfavourably with the latency based threshold or when the queue occupancy level compares unfavourably with the queue occupancy threshold.

22. A system for processing signalling messages enqueued in a queue comprising:
  (a) means for receiving a plurality of signalling messages;
  (b) means for storing said plurality of signalling messages;
  (c) means for processing said plurality of signalling messages; and
  (d) means for transmitting said plurality of signalling messages, wherein said processing means enqueues the plurality of signalling messages into the queue based on two threshold tests, wherein a first test compares a new message expected latency in said queue to a latency based threshold and a second test compares a queue occupancy level in said queue to a queue occupancy threshold.

23. The system of claim 22 wherein the types of signalling messages include dispensable messages, indispensable messages, and essential messages.

24. The system of claim 23 wherein the components (a) to (d) are resident in a switch.

25. The system of claim 24 wherein said switch is taken from the group consisting of frame relay switches, asynchronous transfer mode switches, private branch exchanges, central office exchanges and packet switches.

26. A method of processing incoming call signalling messages into a call processing queue said call signalling messages including dispensable, indispensable and essential message types, the method comprising receiving a call signalling message, and processing said message based on expected latency of the message against a latency based threshold, queue occupancy against an occupancy based threshold, and the message type.

27. The method of claim 26, wherein the latency based threshold assessment is conducted first.

28. The method of claim 26 wherein the occupancy based threshold assessment is conducted first.

29. The method of claim 27 further including determining the presence of a dispensable message in the call processing queue.

30. The method of claim 28 further including determining the presence of a dispensable message in the call processing queue.

31. The processing module of claim 22 wherein:
  (i) when the expected latency compares unfavourably with the latency based threshold, determine the queue occupancy level of said queue;
  (ii) compare said queue occupancy level with a predefined queue occupancy threshold; and
  (iii) when the queue occupancy level compares unfavourably with the queue occupancy threshold, enqueue the plurality of signalling messages in the queue based on the type of signalling message.

* * * * *

UNITED STATES PATENT AND TRADEMARK OFFICE
CERTIFICATE OF CORRECTION

PATENT NO. : 6,614,900 B1
DATED : September 2, 2003
INVENTOR(S) : Yanick H. Champoux It is certified that error appears in the above-identified patent and that said Letters Patent is hereby corrected as shown below:

<u>Column 16,</u>
Line 16, change the numeral "22" to the numeral -- 12 --.

Signed and Sealed this

Ninth Day of March, 2004

JON W. DUDAS
*Acting Director of the United States Patent and Trademark Office*